(12) United States Patent
Lee et al.

(10) Patent No.: US 12,176,575 B2
(45) Date of Patent: Dec. 24, 2024

(54) COATING COMPOSITION FOR SEPARATOR OF SECONDARY BATTERY AND METHOD OF MANUFACTURING THE SAME

(71) Applicant: Electronics and Telecommunications Research Institute, Daejeon (KR)

(72) Inventors: Young-Gi Lee, Daejeon (KR); Ju Young Kim, Sejong-si (KR); Seok Hun Kang, Daejeon (KR); Kwang Man Kim, Daejeon (KR); Young Sam Park, Daejeon (KR); Dong Ok Shin, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 17/506,174

(22) Filed: Oct. 20, 2021

(65) Prior Publication Data

US 2022/0131233 A1   Apr. 28, 2022

(30) Foreign Application Priority Data

Oct. 27, 2020   (KR) .......................... 10-2020-0140515

(51) Int. Cl.
*H01M 50/451* (2021.01)
*C09D 5/02* (2006.01)
(Continued)

(52) U.S. Cl.
CPC .......... *H01M 50/451* (2021.01); *C09D 5/022* (2013.01); *C09D 5/028* (2013.01); *C09D 133/02* (2013.01);
(Continued)

(58) Field of Classification Search
CPC ............. H01M 50/451; H01M 50/403; H01M 50/411; H01M 50/434; H01M 50/446;
(Continued)

(56) References Cited

U.S. PATENT DOCUMENTS 9,123,970 B2   9/2015   Lee et al.
10,177,362 B2  1/2019   Akiike et al.
(Continued)

FOREIGN PATENT DOCUMENTS

KR       10-1392549 B1      5/2014
KR    10-2017-0039620 A     4/2017
(Continued)

OTHER PUBLICATIONS

Jeon, Hyunkyu, et al., "Plasma-assisted water-based Al2O3 ceramic coating for polyethylene-based microporous separators for lithium metal secondary batteries," *Electrochimica Acta*, 212, 2016 (pp. 649-656).

(Continued)

*Primary Examiner* — Alexander M Weddle
(74) *Attorney, Agent, or Firm* — NSIP Law (57) ABSTRACT

Provided is a method of preparing a coating composition for a separator of a secondary battery, and particularly a method including dispersing a first monomer and a surfactant in a solvent to form micelles, adding a first initiator to the solvent and performing first polymerization reaction to form a precursor solution including an emulsion-type binder, and adding a second monomer and a second initiator to the precursor solution and performing second polymerization reaction to form an aqueous binder solution including a solution-type binder, wherein the emulsion-type binder has a core shape, the solution-type binder has a shell shape wrapping the emulsion-type binder, and the emulsion-type binder and the solution-type binder are chemically bonded.

18 Claims, 7 Drawing Sheets

(51) Int. Cl.
*C09D 133/02* (2006.01)
*C09D 133/06* (2006.01)
*H01M 50/403* (2021.01)

(52) U.S. Cl.
CPC ...... *C09D 133/064* (2013.01); *H01M 50/403* (2021.01)

(58) Field of Classification Search
CPC ..... H01M 50/409; C09D 5/022; C09D 5/028; C09D 133/02; C09D 133/064; C08K 2003/2227; Y02E 60/10
See application file for complete search history.

(56) References Cited

U.S. PATENT DOCUMENTS

| | | |
|---|---|---|
| 10,374,206 B2 | 8/2019 | Kim et al. |
| 2008/0131776 A1* | 6/2008 | Sakuma ............... H01M 4/623 525/199 |
| 2015/0295216 A1* | 10/2015 | Okuno ................. H02J 7/0068 320/128 |
| 2017/0155107 A1* | 6/2017 | Akiike ................ H01M 50/403 |
| 2018/0053963 A1* | 2/2018 | Tanaka ............. H01M 10/0525 |

FOREIGN PATENT DOCUMENTS

| | | |
|---|---|---|
| KR | 10-2019-0062924 A | 6/2019 |
| KR | 10-2005869 B1 | 7/2019 |
| KR | 10-2020844 B1 | 11/2019 |
| KR | 10-2019-0139509 A | 12/2019 |

OTHER PUBLICATIONS

Kim, Ju Young, et al., "Graphene Oxide Induced Surface Modification for Functional Separators in Lithium Secondary Batteries," *Scientific reports*, 9, 1, 2019 (pp. 1-7).

* cited by examiner

FIG. 8

COATING COMPOSITION FOR SEPARATOR OF SECONDARY BATTERY AND METHOD OF MANUFACTURING THE SAME

CROSS-REFERENCE TO RELATED APPLICATIONS

This U.S. non-provisional patent application claims priority under 35 U.S.C. § 119 of Korean Patent Application No. 10-2020-0140515, filed on Oct. 27, 2020, the entire contents of which are hereby incorporated by reference.

BACKGROUND

The present disclosure herein relates to a coating composition for a separator of a secondary battery and a method of manufacturing the same.

Lithium ion batteries are currently used as the core power source of portable electronic communication devices such as cellular phones and laptops. The lithium ion batteries show higher storage capacity, better charging and discharging characteristics and higher processabilities than other energy storages such as capacitors and fuel cells, and get a lot of attention as next-generation energy storage devices of wearable devices, electric cars and energy storage systems (ESS). A lithium secondary battery is a battery composed of a positive electrode, a negative electrode, an electrolyte providing a movement path of lithium ions between the positive electrode and the negative electrode, and a separator, and electrical energy is generated by redox reaction during intercalation/deintercalation of lithium ions at the positive electrode and the negative electrode. A lithium metal having a high energy density of a lithium secondary battery is used as the negative electrode, and a liquid solvent is used as the electrolyte. In the recent lithium secondary batteries, an organic liquid electrolyte is used as ion carriers transporting lithium ions between cathode and anode while operating in high performance and energy storage devices.

However, a nonaqueous electrolyte with high ignition hazard is used, and the lithium secondary battery is driven in a high voltage range, and accordingly, unexpected fire accident may arise. Particularly, the industrial trends of secondary batteries change from small-size secondary batteries such as cellular phones and portable devices to medium to large-size secondary batteries such as electric cars and energy storage systems, and such safety problems during battery operation stand out increasingly.

SUMMARY

The present disclosure provides a coating composition for a separator of a secondary battery, having improved thermal stability and mechanical stability, and a method of manufacturing the same.

The present disclosure also provides a separator of a secondary battery, having improved thermal stability and mechanical stability, and a method of manufacturing the same.

The tasks to be solved by the inventive concept is not limited to the above-described tasks, however other tasks not mentioned will be precisely understood from the description below by a person skilled in the art.

An embodiment of the inventive concept provides a method of preparing a coating composition for a separator of a secondary battery, including dispersing a first monomer and a surfactant in a solvent to form micelles, adding a first initiator to the solvent and performing first polymerization reaction to form a precursor solution including an emulsion-type binder, and adding a second monomer and a second initiator to the precursor solution and performing second polymerization reaction to form an aqueous binder solution including a solution-type binder, wherein the emulsion-type binder has a core shape, the solution-type binder has a shell shape wrapping the emulsion-type binder, and the emulsion-type binder and the solution-type binder are chemically bonded.

In an embodiment, the method may further include dispersing ceramic particles in the aqueous binder solution to form a slurry.

In an embodiment, the solution-type binder may include a coating layer wrapping the surface of the emulsion-type binder, and a polymer chain radially crosslinked from the coating layer.

In an embodiment, the emulsion-type binder may include a first acrylic polymer, the coating layer may include a second acrylic polymer, and the polymer chain radially crosslinked from the coating layer may include a second acrylic polymer chain.

In an embodiment, the first monomer may include at least one among carboxyethyl acrylate, hydroxyethyl acrylate, ethylhexyl acrylate, methyl acrylate, ethyl acrylate, butyl acrylate, hexyl acrylate, lauryl acrylate, propargyl acrylate, isobutyl acrylate, methyl methacrylate, ethyl methacrylate, butyl methacrylate, hydroxyethyl methacrylate, hydroxypropyl methacrylate, ethylhexyl methacrylate, glycidyl methacrylate, stearyl methacrylate, lauryl methacrylate, acrylic acid, methacrylic acid, sodium acrylate, sodium methacrylate, acrylonitrile, acrylamide, and methacrylamide.

In an embodiment, the second monomer may include at least one among acrylic acid, methacrylic acid, sodium acrylate, and sodium methacrylate.

In an embodiment, the performing of the second polymerization reaction may further include adding a comonomer to the second monomer, and the comonomer may include at least one among carboxyethyl acrylate, hydroxyethyl acrylate, ethylhexyl acrylate, methyl acrylate, ethyl acrylate, butyl acrylate, hexyl acrylate, lauryl acrylate, propargyl acrylate, isobutyl acrylate, methyl methacrylate, ethyl methacrylate, butyl methacrylate, hydroxyethyl methacrylate, hydroxypropyl methacrylate, ethylhexyl methacrylate, glycidyl methacrylate, stearyl methacrylate, lauryl methacrylate, acrylonitrile, acrylamide, and methacrylamide.

In an embodiment, the first polymerization reaction may be emulsion polymerization reaction.

In an embodiment, the second polymerization reaction may be redox polymerization reaction.

In an embodiment, the first initiator may include at least one among hydrogen peroxide, ammonium persulfate, a ferrous salt, potassium persulfate, sodium bisulfite, sodium peroxomonosulfate, and sodium peroxydiphosphate.

In an embodiment, the second initiator may include at least one among potassium persulfate, sodium bisulfite, sodium peroxomonosulfate, and sodium peroxydiphosphate.

In an embodiment, the surfactant may include an anionic surfactant such as sodium dodecylbenzenesulfonate, ammonium dodecylbenzenesulfonate, sodium polyoxyethylene alkyl aryl sulfate, ammonium polyoxyethylene alkyl sulfate, polyoxyethylene aryl ether phosphate, and polyoxyethylene alkyl ether phosphate, or at least one among polyethylene glycol, polypropylene glycol, polyoxyethylene alkyl ether, polyoxypropylene alkyl ether, polyoxyethylene polyoxypropylene alkyl ether, polyoxyethylene alkylamine, hydroxymethyl cellulose, hydroxyethyl cellulose, and hydroxybutyl cellulose.

According to an embodiment of the inventive concept, there is provided a method of manufacturing a separator of a secondary battery, including dispersing a first monomer and a surfactant in a solvent to form micelles, adding a first initiator to the solvent and performing first polymerization reaction to form a precursor solution including an emulsion-type binder, adding a second monomer and a second initiator to the precursor solution and performing second polymerization reaction to form an aqueous binder solution including a solution-type binder, dispersing ceramic particles in the aqueous binder solution to form a slurry, and applying the slurry on a separator base material, wherein the emulsion-type binder has a core shape, the solution-type binder has a shell shape wrapping the emulsion-type binder, and the emulsion-type binder and the solution-type binder are chemically bonded.

In an embodiment, the ceramic particle may include at least one among alumina, boehmite, silicon dioxide, titanium dioxide, zirconium dioxide, ruthenium oxide, iron oxide, cobalt oxide, and nickel oxide.

In an embodiment, the emulsion-type binder may have a weight average molecular weight (Mw) of about 100,000 to about 1,000,000.

In an embodiment, the aqueous binder may have a weight average molecular weight (Mw) of about 100,000 to about 1,500,000.

In an embodiment, the method may further include forming a coating layer through drying the slurry applied on the separator base material, and a thickness of the coating layer may be from about 0.5 μm to about 10 μm.

In an embodiment, a weight ratio of the ceramic particles and the aqueous binder may be from about 60:40 to about 99:1.

In an embodiment, an average particle size of the aqueous binder may be from about 0.1 μm to about 5 μm.

According to another embodiment of the inventive concept, there is provided a coating composition for a separator of a secondary battery, including an aqueous binder solution including an emulsion-type binder and a solution-type binder, and ceramic particles dispersed in the aqueous binder solution, wherein the emulsion-type binder includes a first acrylic polymer formed into a micelle structure, the solution-type binder includes a coating layer including a second acrylic polymer, and a second acrylic polymer chain radially crosslinked from the coating layer, the emulsion-type binder has a core shape, the solution-type binder has a shell shape wrapping the emulsion-type binder, and the emulsion-type binder and the solution-type binder are chemically bonded.

BRIEF DESCRIPTION OF THE FIGURES

The accompanying drawings are included to provide a further understanding of the inventive concept and are incorporated in and constitute a part of this specification. The drawings illustrate embodiments of the inventive concept and, together with the description, serve to explain principles of the inventive concept. In the drawings.

DETAILED DESCRIPTION

The above objects, features and methods for accomplishing thereof of the inventive concept will be clarified referring to embodiments below with reference to the accompanying drawings. The inventive concept may, however, be embodied in different forms and should not be construed as limited to the embodiments set forth herein. Rather, embodiments are provided so that the contents disclosed herein become thorough and complete, and the spirit of the inventive concept is sufficiently accepted for a person skilled in the art. The inventive concept is defined by the scope of claims, and like reference numerals refer to like elements for explaining each drawing throughout.

The terminology used herein is for the purpose of describing particular embodiments only and is not intended to be limiting of the invention. As used herein, the singular forms, are intended to include the plural forms as well, unless the context clearly indicates otherwise. It will be further understood that the terms "comprises" and/or "comprising", when used in this specification, specify the presence of stated elements, steps, operations, and/or devices, but do not preclude the presence or addition of one or more other elements, steps, operations, and/or devices.

It will be understood that when a film (or layer) is referred to as being "on" another film (or layer), the film (or layer) can be directly on the other film (or layer), or intervening films (or layers) may be present.

In addition, the embodiments described in the present disclosure will be explained referring to cross-sectional views and/or plan views of ideal illustrations of the inventive concept. In the drawings, the thicknesses of layers and areas are exaggerated for effective explanation of the technical contents. Accordingly, the shape of the illustrations may be deformed by manufacturing technique and/or tolerance. Accordingly, the embodiments of the inventive concept are not limited to the illustrated specific shapes but include changed shapes produced according to a manufacturing process. Therefore, the regions shown in the drawings have schematic property, the shape of the regions illustrated are for showing the specific shape of the regions of a device, but are not intent to limit the scope of the invention.

The terms used in the embodiments of the inventive concept may be interpreted as commonly known meanings to a person skilled in the art unless otherwise defined.

Figure 1:
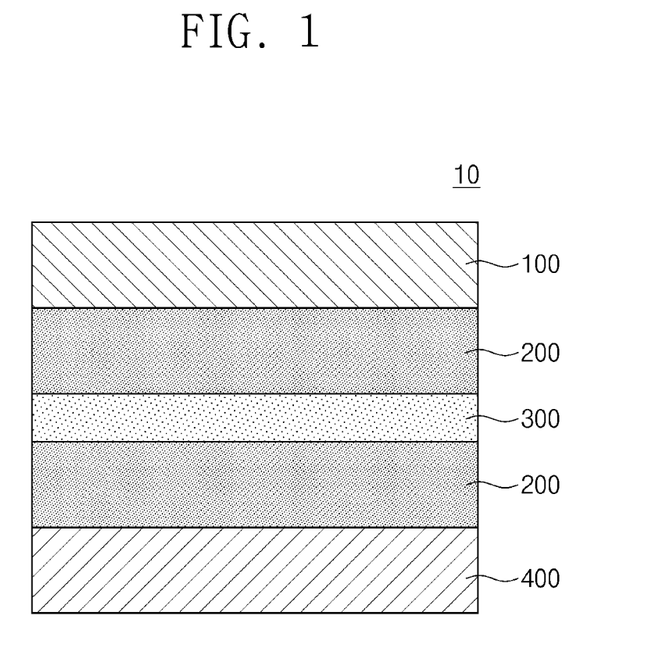
FIG. 1 is a cross-sectional view showing a secondary battery according to an embodiment of the inventive concept.
Figure 2:
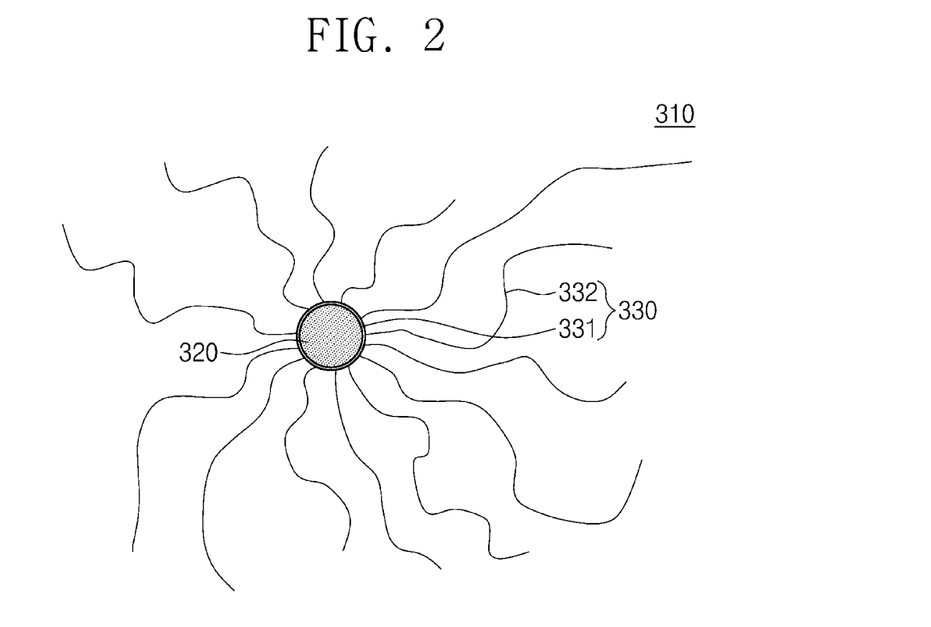
FIG. 2 is a schematic diagram for explaining an aqueous binder with a core-shell structure.
Figure 3:
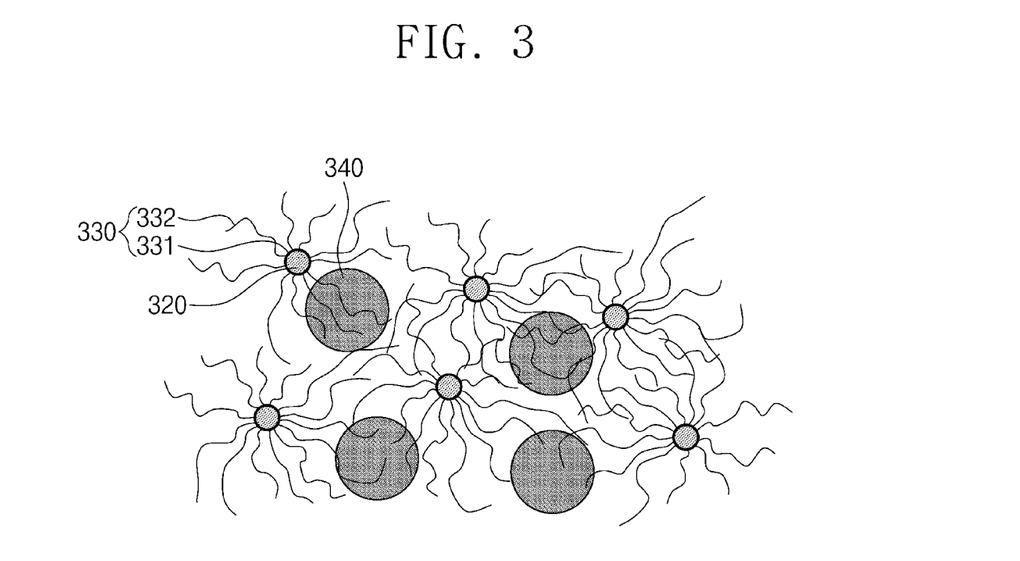
FIG. 3 is a schematic diagram for explaining a slurry including an aqueous binder with a core-shell structure.

FIG. 1 is a cross-sectional view showing a secondary battery according to an embodiment of the inventive concept. FIG. 2 is a schematic diagram for explaining an aqueous binder with a core-shell structure. FIG. 3 is a schematic diagram for explaining a slurry including an aqueous binder with a core-shell structure.

Referring to FIG. 1 to FIG. 3, a secondary battery 10 may include a positive electrode 100, an electrolyte layer 200, a separator 300, and a negative electrode 400. The positive electrode 100 and the negative electrode 400 may be separately disposed and may be opposite to each other. The electrolyte layer 200 may be disposed between the positive electrode 100 and the separator 300, and between the separator 300 and the negative electrode 400.

The secondary battery 10 may be, for example, a lithium secondary battery. The positive electrode 100 may include a positive electrode active material. The positive electrode active material may include at least one among sulfur, $LiCoO_2$, $LiNiO_2$, $LiNi_xCo_yMn_zO_2$ (x+y+z=1), $LiMn_2O_4$, and $LiFePO_4$. The negative electrode 400 may include a negative active material. The negative electrode active material may include at least one among silicon (Si), tin (Sn), graphite, and lithium (Li). Each of the positive electrode 100 and the negative electrode 400 may include a polymer-type binder and a conductive material. The polymer-type binder may include at least one among an aqueous polymer (for example, carboxymethyl cellulose (CMC) and polyacrylic acid (PAA)), polyvinylidene fluoride (PVdF), styrene-butadiene rubber (SBR), nitrile rubber (NBR), and polyvinylpyrrolidone (PVP). The conductive material may include at least one among carbon black, carbon nanotube (CNT), and graphite. The conductive material may play the role of assisting the movement of electrons. The amount ratio of the positive active material:polymer-type binder:conductive material may be about 80:10:10 to about 96:2:2. The amount ratio of the negative active material:polymer-type binder:conductive material may be about 80:10:10 to about 96:2:2. However, an embodiment of the inventive concept is not limited thereto, and the amount of the polymer-type binder or the conductive material may be controlled according to the properties of the positive electrode active material or the negative electrode active material.

The electrolyte layer 200 may play the function of transferring ions to the positive electrode 100 and the negative electrode 400. The electrolyte layer 200 may include, for example, a liquid electrolyte. The electrolyte layer 200 may include a lithium salt and an organic solvent. The lithium salt may include at least one among $LiPF_6$, $LiBF_4$, $LiSbF_6$, $LiAsF_6$, $LiClO4$, $LiN(C_2F_5SO_2)_2$, $LiN(CF_3SO_2)_2$, $CF_3SO_3Li$, $LiC(CF_3SO_2)_3$, and $LiC_4BO_8$. The organic solvent may include a cyclic carbonate or a linear carbonate. For example, the cyclic carbonate may include at least one among γ-butyrolactone, ethylene carbonate, propylene carbonate, glycerin carbonate, vinylene carbonate, and fluoroethylene carbonate. For example, the linear carbonate may include at least one among dimethyl carbonate, diethyl carbonate, ethyl methyl carbonate, dimethoxyethane, and dimethyl ethylene carbonate. The concentration of the lithium salt in the electrolyte layer 200 may be from about 1 M to about 3 M. In some embodiments of the inventive concept, the electrolyte layer 200 may further include an additive to improve the performance of a secondary battery. The additive may include fluoroethylene carbonate or vinylene carbonate.

The separator 300 may be disposed in the electrolyte layer 200. The separator 300 may prevent electric short between the positive electrode 100 and the negative electrode 400.

For example, the separator 300 may include a separator base material. On the separator base material, a coating composition for a separator of a secondary battery may be applied. The separator base material may include, for example, at least one among polyolefin such as polyethylene and polypropylene, and cellulose. In some embodiments, the separator base material may include a porous polymer layer or a non-woven fabric.

The coating composition for a separator of a secondary battery may include a slurry in which ceramic particles 340 are dispersed an aqueous binder solution. The aqueous binder solution may include an emulsion-type binder 320, a solution-type binder 330, and a solvent. The emulsion-type binder 320 has a core shape, the solution-type binder 330 has a shell shape wrapping the emulsion-type binder 320, and the emulsion-type binder 320 and the solution-type binder 330 may have a chemically bonded structure. That is, the aqueous binder 310 may have an integral structure of a core-shell shape. The emulsion-type binder 320 may include a first acrylic polymer formed into a micelle structure. The solution-type binder 330 may include a coating layer 331 including a second acrylic polymer, and a second acrylic polymer chain 332 radially crosslinked from the coating layer 331. The coating layer 331 may wrap the emulsion-type binder 320. In an embodiment, the radially crosslinked second acrylic polymer chain 332 may be water-soluble.

The first acrylic polymer may be a polymer formed by first polymerization reaction of a first monomer and a first initiator. The first polymerization reaction may be emulsion polymerization reaction.

The first monomer may include at least one among carboxyethyl acrylate, hydroxyethyl acrylate, ethylhexyl acrylate, methyl acrylate, ethyl acrylate, butyl acrylate, hexyl acrylate, lauryl acrylate, propargyl acrylate, isobutyl acrylate, methyl methacrylate, ethyl methacrylate, butyl methacrylate, hydroxyethyl methacrylate, hydroxypropyl methacrylate, ethylhexyl methacrylate, glycidyl methacrylate, stearyl methacrylate, lauryl methacrylate, acrylic acid, methacrylic acid, sodium acrylate, sodium methacrylate, acrylonitrile, acrylamide, and methacrylamide.

The first initiator may include at least one among hydrogen peroxide, ammonium persulfate, a ferrous salt, potassium persulfate, sodium bisulfite, sodium peroxomonosulfate, and sodium peroxydiphosphate.

In an embodiment, the emulsion-type binder 320 may have a weight average molecular weight (Mw) of about 100,000 to about 1,000,000. The weight average molecular weight (Mw) of the emulsion-type binder 320 may influence the binding properties of ceramic particles 340. In an embodiment, an average particle size of the emulsion-type binder 320 may be about 50 nm to about 500 nm. If the average particle size of the emulsion-type binder 320 is less than about 50 nm, the pores at the surface of the separator 300 may be blocked, and if the particle size is greater than about 500 nm, uniform adhesion of the ceramic particles 300 may be inhibited.

The second acrylic polymer may be a polymer formed by second polymerization reaction of a second monomer and a second initiator. The second polymerization reaction may be redox polymerization reaction.

The second monomer may include at least one among acrylic acid, methacrylic acid, sodium acrylate, and sodium methacrylate. At least one comonomer among carboxyethyl acrylate, hydroxyethyl acrylate, ethylhexyl acrylate, methyl acrylate, ethyl acrylate, butyl acrylate, hexyl acrylate, lauryl acrylate, propargyl acrylate, isobutyl acrylate, methyl methacrylate, ethyl methacrylate, butyl methacrylate, hydroxyethyl methacrylate, hydroxypropyl methacrylate, ethylhexyl methacrylate, glycidyl methacrylate, stearyl methacrylate, lauryl methacrylate, acrylonitrile, acrylamide, and methacrylamide may be mixed the second monomer, and polymerization reaction may be performed.

The second initiator may include at least one among potassium persulfate, sodium bisulfite, sodium peroxomonosulfate, and sodium peroxydiphosphate.

The aqueous binder solution may include an aqueous binder 310 and a solvent. The weight average molecular weight (Mw) of the aqueous binder 310 may be about 100,000 to about 1,500,000. The average particle size of the aqueous binder 310 may be from about 0.1 µm to about 5 µm. In an embodiment, the solvent of the aqueous binder solution may include water.

The emulsion-type binder 320 in the aqueous binder 310 may play the role of strongly attaching the ceramic particles 340 to the surface of the separator 300. In addition, the second acrylic polymer chains 332 radially crosslinked in the solution-type binder 330 at the surface of the emulsion-type binder 320 may have a constant viscosity according to a molecular weight, maintain the dispersion of the ceramic particles 340 in the solvent, and control the viscosity of a slurry. Accordingly, coatability may be improved so that the coating composition for a separator of a secondary battery may be uniformly applied on the surface of the separator 300.

The ceramic particle 340 may include at least one among alumina, boehmite, silicon dioxide, titanium dioxide, zirconium dioxide, ruthenium oxide, iron oxide, cobalt oxide, and nickel oxide. The particle size ($D_{50}$) of the ceramic particles 340 may be from about 500 nm to about 5 µm. The particle size ($D_{50}$) of the ceramic particles 340 may influence the mobility of ions in an electrolyte layer 200.

In an embodiment, the composition ratio of the ceramic particles 340 and the aqueous binder 310 may be about 60:40 to about 99:1, more preferably, about 80:20 to about 99:1 on the basis of a weight ratio. In an embodiment, the viscosity of a slurry may be about 100 cP to about 6000 cP. If the viscosity of the slurry is less than about 100 cP, the mobility of the slurry increases excessively due to a low viscosity, and wettability with a hydrophobic separator may be deteriorated. If the viscosity of the slurry is greater than about 6000 cP, water in the slurry may be insufficient, water may be volatilized during an applying process, and the mobility of the slurry may be excessively deteriorated, and uniform application may not be achieved. After applying the slurry on the separator 300, the slurry may be dried to form a coating layer. In an embodiment, the thickness of the coating layer on the separator 300 may be about 0.5 µm to about 10 µm, preferably, about 1 µm to about 5 µm. If the thickness of the coating layer on the separator 300 is less than about 0.5 µm, there are problems of reducing the thermal stability of the separator 300. If the thickness of the coating layer on the separator 300 is greater than about 10 µm, the permeability of lithium ions through the separator 300 may be reduced, and accordingly, the weight and volume of a secondary battery may increase to reduce the total volume and the energy density per weight. The porosity of the slurry after the applying and drying on the separator 300 may be about 20% to about 80%.

Figure 4:
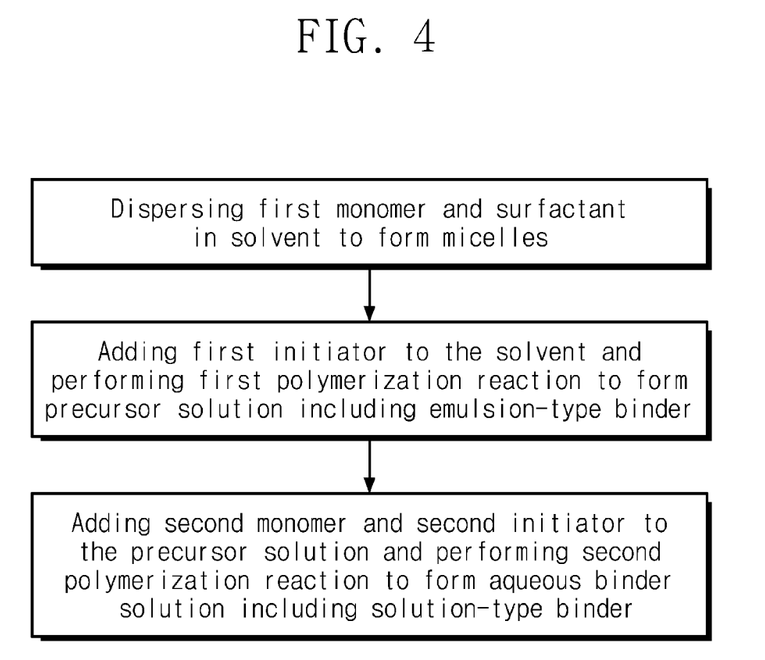
FIG. 4 is a flowchart for explaining a method of preparing a coating composition for a separator of a secondary battery according to an embodiment of the inventive concept.

FIG. 4 is a flowchart for explaining a method of preparing a coating composition for a separator of a secondary battery according to an embodiment of the inventive concept. Hereinafter, overlapping parts with the above-described contents may be omitted.

Referring to FIG. 4, the method of preparing a coating composition for a separator of a secondary battery according to an embodiment of the inventive concept may include dispersing a first monomer and a surfactant in a solvent to form micelles, adding a first initiator to the solvent and performing first polymerization reaction to form a precursor solution including an emulsion-type binder 320, adding a second monomer and a second initiator to the precursor solution and performing second polymerization reaction to form an aqueous binder solution including a solution-type binder 330, and dispersing ceramic particles 340 in the aqueous binder solution to form a slurry.

The forming of the micelles may include forming micelles by dispersing a single or mixed first monomer and a surfactant in water and standing thereof over time. The surfactant may include a nonionic surfactant. For example, the nonionic surfactant may include an anionic surfactant such as sodium dodecylbenzenesulfonate, ammonium dodecylbenzenesulfonate, sodium polyoxyethylene alkyl aryl sulfate, ammonium polyoxyethylene alkyl aryl sulfate, polyoxyethylene aryl ether phosphate, and polyoxyethylene alkyl ether phosphate, or at least one among polyethylene glycol, polypropylene glycol, polyoxyethylene alkyl ether, polyoxypropylene alkyl ether, polyoxyethylene polyoxypropylene alkyl ether, polyoxyethylene alkylamine, hydroxymethyl cellulose, hydroxyethyl cellulose, and hydroxybutyl cellulose.

The formation of a precursor solution including the emulsion-type binder 320 may include initiating emulsion polymerization reaction of the single or mixed first monomer in the micelles by the first initiator. The formation of the precursor solution including the emulsion-type binder 320 may be performed in a heating state for about 5 hours or more. The formation of the aqueous binder solution may include initiating the redox polymerization reaction of the emulsion-type binder 320 and the second monomer by the second initiator to form a solution-type binder 330. A portion of the solution-type binder 330 may be formed into a coating layer 331 wrapping the surface of the emulsion-type binder 320, and the other portion of the solution-type binder 330 may be formed into polymer chains 332 radially crosslinked from the coating layer 331.

The method of manufacturing a separator of a secondary battery according to an embodiment of the inventive concept may include dispersing a first monomer and a surfactant in a solvent to form micelles, adding a first initiator to the solvent and performing first polymerization reaction to form a precursor solution including an emulsion-type binder 320, adding a second monomer and a second initiator to the precursor solution and performing second polymerization reaction to form an aqueous binder solution including a solution-type binder 330, dispersing ceramic particles 340 in the aqueous binder solution to form a slurry, applying the slurry on a separator base material, and drying the applied slurry.

The application of the slurry on the separator base material may be performed by, for example, any one layer-thickening process among a gravure coating method, a small-diameter gravure coating method, a reverse roll coating method, a transfer roll coating method, a kiss coating method, a dip coating method, a knife coating method, an air doctor blade coating method, a blade coating method, a bar coating method, a die coating method, a screen printing method, and a spray coating method.

The drying of the applied slurry may be performed by, for example, hot air drying and then, drying under a reduced pressure. However, an embodiment of the inventive concept is not limited thereto, and any methods for completely removing water in the slurry may be used, without limitation. Accordingly, in order to satisfy the moisture content of several ppm or less in a liquid electrolyte layer 200 after forming a positive electrode 100, an electrolyte layer 200 and a negative electrode 400, the drying under a reduced pressure may be performed for about 1 hour or more. The temperature for performing the drying under a reduced pressure may be about 100° C. or less, preferably, about 80° C. or less. If the temperature for performing the drying under a reduced pressure is higher than about 100° C., the deformation or damage problems of the separator 300 may be generated.

Example 1

To a reactor, ethyl acrylate and an acrylic acid monomer were added in a ratio of about 50:50 together with water. To the reactor, an anionic surfactant of a sodium dodecylbenzenesulfonate was added, followed by stirring for about 2 hours in a stirring rate of about 150 rpm or more to form micelles. An ammonium persulfate initiator was added in 0.5 mol % of the monomer content to the reactor, and emulsion polymerization was performed at about 40° C. The weight average molecular weight (Mw) of the emulsion thus synthesized was about 700,000, and the average particle size of the emulsion was about 300 nm.

In order to form acrylic acid-based single polymer chains into a radial structure at the surface of emulsion particles, an acrylic acid monomer was injected to the aqueous emulsion solution synthesized by the emulsion polymerization, and stirring was performed for about 2 hours. To the reactor, a potassium persulfate initiator in 0.5 mol % of the monomer content and an ammonium bisulfate initiator in 0.25 mol % of the monomer content were added, and redox polymerization was performed at room temperature for about 5 hours. The weight average molecular weight (Mw) of the aqueous binder thus synthesized was about 1,000,000, and an average particle size was about 1.8 μm.

Example 2

An aqueous binder was synthesized by the same method as Example 1 except for adding a butyl acrylate monomer instead of the ethyl acrylate monomer during performing the emulsion polymerization.

Example 3

An aqueous binder was synthesized by the same method as Example 1 except for adding sodium acrylate and ethyl acrylate in a ratio of about 50:50 instead of the acrylic acid monomer during performing the redox polymerization.

Example 4

To the aqueous binder solution synthesized in Example 1, ceramic particles were dispersed to prepare a slurry. The polymer solid content in the aqueous binder solution was about 45 to about 50 wt %, and water was additionally added to dilute to an about 5 wt % solution. As the ceramic particles, alumina particles having an average particle size ($D_{50}$) of a powder of about 279 nm was used. 9.7 g of alumina and 6 g of the aqueous binder solution of about 5 wt % were mixed so that a weight ratio of the alumina and the aqueous binder became about 97:3, to prepare a slurry based on 10 g of a solute. For homogeneous mixing, stirring was performed using a planetary mixer in about 2000 rpm for about 20 minutes. In order to prevent the agglomeration phenomenon of alumina particles, zirconia balls with about 5 mm were added and stirred, and the viscosity of the slurry was controlled to about 300 cP to about 400 cP. A slurry coating process was performed on a hydrophobic separator using a doctor blade method. The height of a doctor blade was controlled at about 25 μm, and alumina/aqueous binder was finally coated to a thickness of about 5 μm on a separator.

Example 5

A separator was coated by the same method as Example 4 except for controlling the viscosity of a slurry to about 200 cP to about 300 cP, controlling the height of a doctor blade at about 20 μm, and finally applying alumina/aqueous binder to a thickness of about 2 μm on a separator.

Example 6

A separator was coated by the same method as Example 4 except for using the aqueous binder synthesized in Example 2.

Example 7

A separator was coated by the same method as Example 6 except for controlling the viscosity of a slurry to about 200 cP to about 300 cP, controlling the height of a doctor blade at about 20 μm, and finally applying alumina/aqueous binder to a thickness of about 2 μm on a separator.

Example 8

A separator was coated by the same method as Example 4 except for using the aqueous binder synthesized in Example 3.

Example 9

A separator was coated by the same method as Example 8 except for controlling the viscosity of a slurry to about 200 cP to about 300 cP, controlling the height of a doctor blade at about 20 μm, and finally applying alumina/aqueous binder to a thickness of about 2 μm on a separator.

Comparative Example 1

In order to compare the performance and properties of the coated separators in Example 4, Example 6, and Example 8, a mixture-type aqueous binder was prepared by mixing an emulsion-type binder and a solution-type binder in about 50:50. The polymer solid content in the emulsion-type binder solution was about 45 wt %, the polymer solid content in the solution-type binder solution was about 10 wt %, and water was added to dilute to an about 2.5 wt % solution. The emulsion-type binder solution and the solution-type binder solution were mixed in a weight ratio of about 50:50. According to a mixing sequence, alumina particles were injected first to the solution-type aqueous binder solution and mixed, and then, the emulsion-type aqueous binder solution was added to prepare a slurry for coating. 9.7 g of alumina and 6 g of the aqueous binder solution of about 2.5 wt % were mixed so that a weight ratio of the alumina and the aqueous binder became about 97:3, to prepare a slurry based on 10 g of a solute. For homogeneous mixing, a first stirring process was performed using a planetary mixer in about 5000 rpm for about 20 minutes. Then, 6 g of the emulsion-type aqueous binder solution of about 2.5 wt % was added, and a second mixing process was performed. In order to prevent the agglomeration phenomenon of alumina particles, zirconia balls with about 5 mm were added and stirred, and the viscosity of the slurry was controlled to about 300 cP to about 400 cP. A slurry coating process was performed on a separator with a thickness of about 12 m using a doctor blade method. The height of a doctor blade was controlled at about 25 μm, and alumina/mixture-type aqueous binder was finally coated to a thickness of about 5 μm on a separator.

Comparative Example 2

In order to compare the performance and properties of coated separators in Example 5, Example 7, and Example 9, a separator was coated by the same method as Comparative Example 1 except for controlling the viscosity of a slurry to about 200 cP to about 300 cP, controlling the height of a doctor blade at about 20 μm, and finally applying alumina/mixture-type aqueous binder to a thickness of about 2 μm on a separator.

Experimental Example

Figure 6:
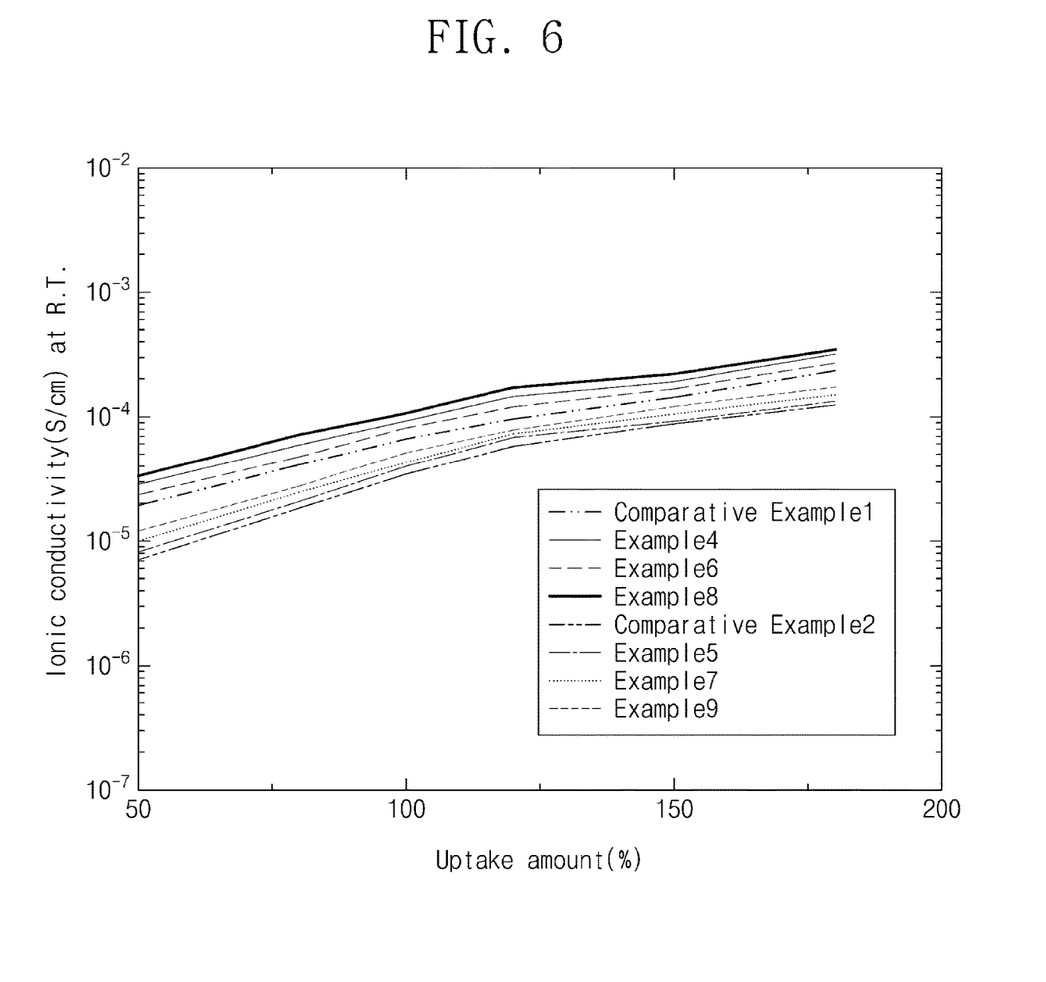
FIG. 6 is a graph showing measured results of ionic conductivity at room temperature in accordance with an uptake amount of a liquid electrolyte for ceramic coated separators manufactured in Example 4 to Example 9, Comparative Example 1 and Comparative Example 2.

The thickness, permeability and heat shrinkage of the ceramic coated separators manufactured according to Example 4 to Example 9, Comparative Example 1 and Comparative Example 2 were measured and shown in Table 1.

this, if the uptake amounts were fixed with the same amount, ion moving properties in separators could be observed. It could be confirmed that the ion conductivity of Example 4 to Example 9 with ceramic particles coated with uniform distribution was higher than Comparative Example 1 and Comparative Example 2. This is interpreted that the ceramic particles were uniformly dispersed on the surface of the separators even with the same amount of electrolytes, and ion moving paths were formed relatively well. In addition, it could be confirmed that the ion conductivity properties were high with the increase of the thickness of the ceramic coated layer, and this is thought due to the difference of the uptake amounts.

Figure 7:
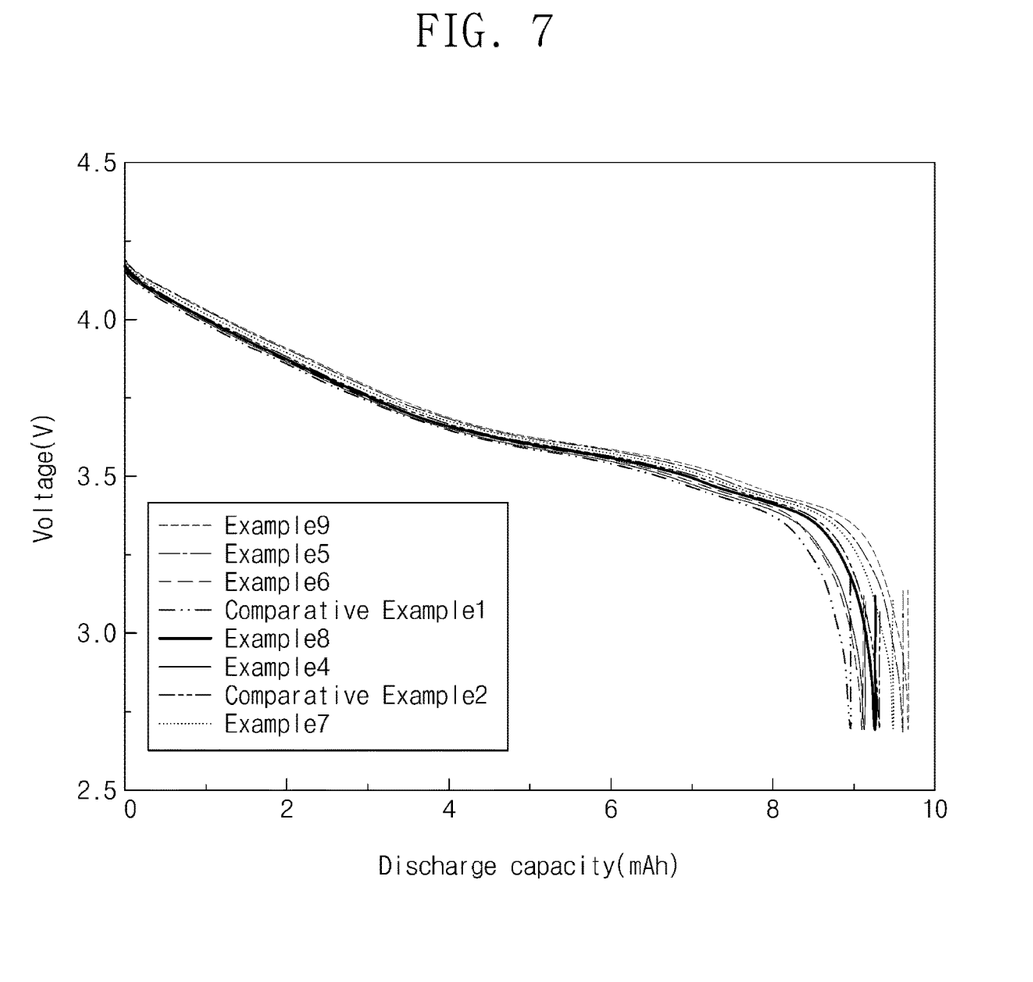
FIG. 7 is a graph showing measured results of initial discharge capacity for single cells constituted using ceramic coated separators manufactured in Example 4 to Example 9, Comparative Example 1 and Comparative Example 2.

FIG. 7 is a graph showing measured results of initial discharge capacity for single cells constituted using ceramic coated separators manufactured in Example 4 to Example 9, Comparative Example 1 and Comparative Example 2.

As a single cell for measuring charging and discharging performance, a pouch type mono cell with a size of 2 cm×2 cm was manufactured. In this case, the composition of a negative electrode plate was fixed so that the weight ratio of natural graphite negative electrode active material:SMR/CMC binder was about 98:2 (SBR:CMC=1:1, weight ratio), and the composition of a positive electrode plate was fixed so that the weight ratio of NCM622 positive electrode active material:PVdF binder:conductive material was about 96:2:2. The electrode thickness was controlled and designed so that a ratio of negative electrode capacity/positive electrode capacity became about 1.02. As an organic solvent, ethylene carbonate and ethyl methyl carbonate were mixed in a weight ratio of 3:7, and a liquid electrolyte was prepared so

| Division | Comparative Example 1 | Example 4 | Example 6 | Example 8 | Comparative Example 2 | Example 5 | Example 7 | Example 9 |
|---|---|---|---|---|---|---|---|---|
| Thickness (μm) | 22.2 | 22.0 | 22.1 | 22.2 | 16.1 | 16.2 | 16.0 | 16.0 |
| Permeability (sec/100 mL) | 201.5 | 195.6 | 199.3 | 194.8 | 197.3 | 192.1 | 194.7 | 190.1 |
| Heat shrinkage @ 150° C. (%) | MD3.6 TD3.6 | MD1.5 TD1.5 | MD2.6 TD2.1 | MD1.0 TD1.0 | MD3.0 TD3.0 | MD2.0 TD2.0 | MD2.4 TD2.4 | MD1.5 TD1.5 |

Referring to Table 1, in could be confirmed that in the cases of applying the integral-type binders according to the inventive concept (Example 4 to Example 9), the heat shrinkage at about 150° C. and permeability performance were markedly improved when compared to the conventional mixture-type binders (Comparative Example 1 and Comparative Example 2).

Figure 5:
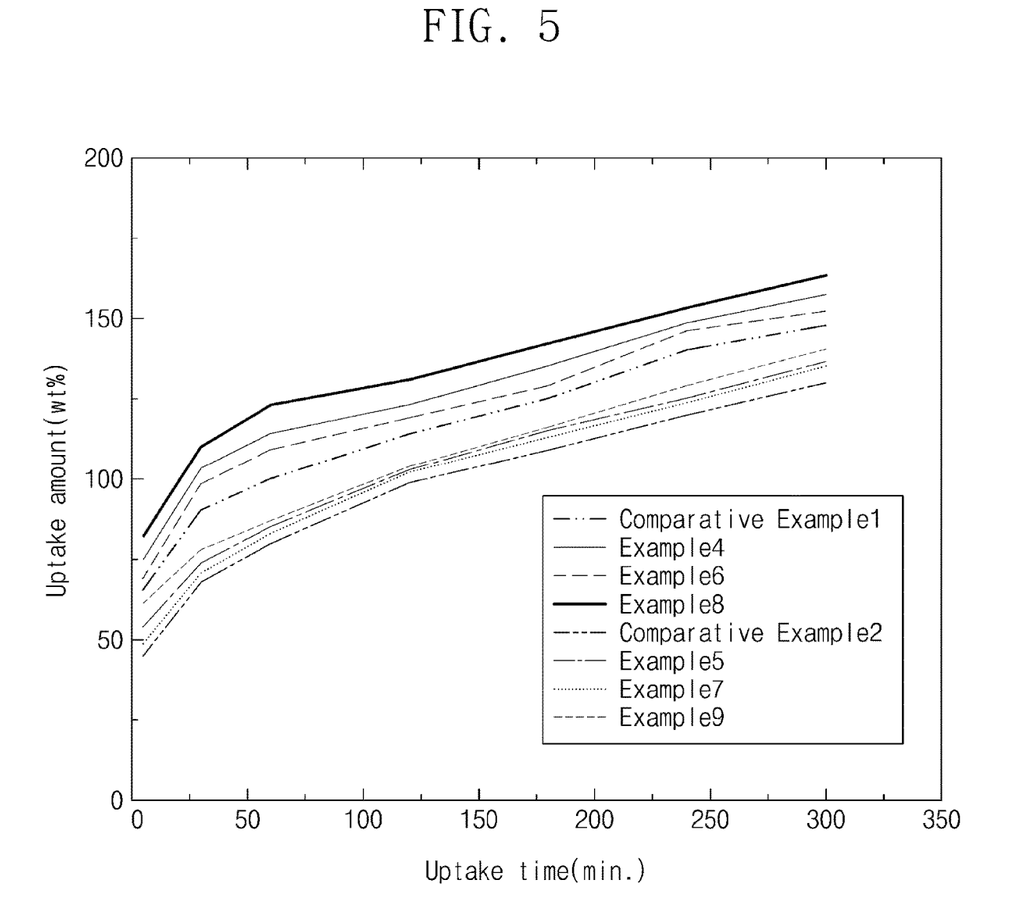
FIG. 5 is a graph showing measured results of an uptake amount in accordance with an uptake time of liquid electrolytes of ceramic coated separators manufactured in Example 4 to Example 9, Comparative Example 1 and Comparative Example 2.

FIG. 5 is a graph showing measured results of an uptake amount in accordance with an uptake time of a liquid electrolyte for ceramic coated separators manufactured in Example 4 to Example 9, Comparative Example 1 and Comparative Example 2. It could be confirmed that Example 4 to Example 9 showed better uptake properties than Comparative Example 1 and Comparative Example 2. It is thought that ceramic particles were coated with uniform distribution on the surface of the separator, and uniform uptake was rapidly progressed. In addition, it could be confirmed that the uptake amount increased with the increase of the thickness of the ceramic coated layer.

FIG. 6 is a graph showing measured results of ionic conductivity at room temperature in accordance with an uptake amount of a liquid electrolyte for ceramic coated separators manufactured in Example 4 to Example 9, Comparative Example 1 and Comparative Example 2. Through that 1.3 mol of a lithium salt of lithium hexafluorophosphate was dissolved. The liquid electrolyte was injected into a single cell to manufacture a cell.

An initial discharge capacity showed different behavior from that of the uptake amount of the electrolyte and the ion conductivity properties. In the cases of Example 4 to Example 9, the uptake amount and ion conductivity properties were all improved through the uniform coating of the ceramic particles when compared to Comparative Example 1 and Comparative Example 2. However, the discharge capacity showed very excellent performance with the reduction of the total thickness of the separator.

Figure 8:
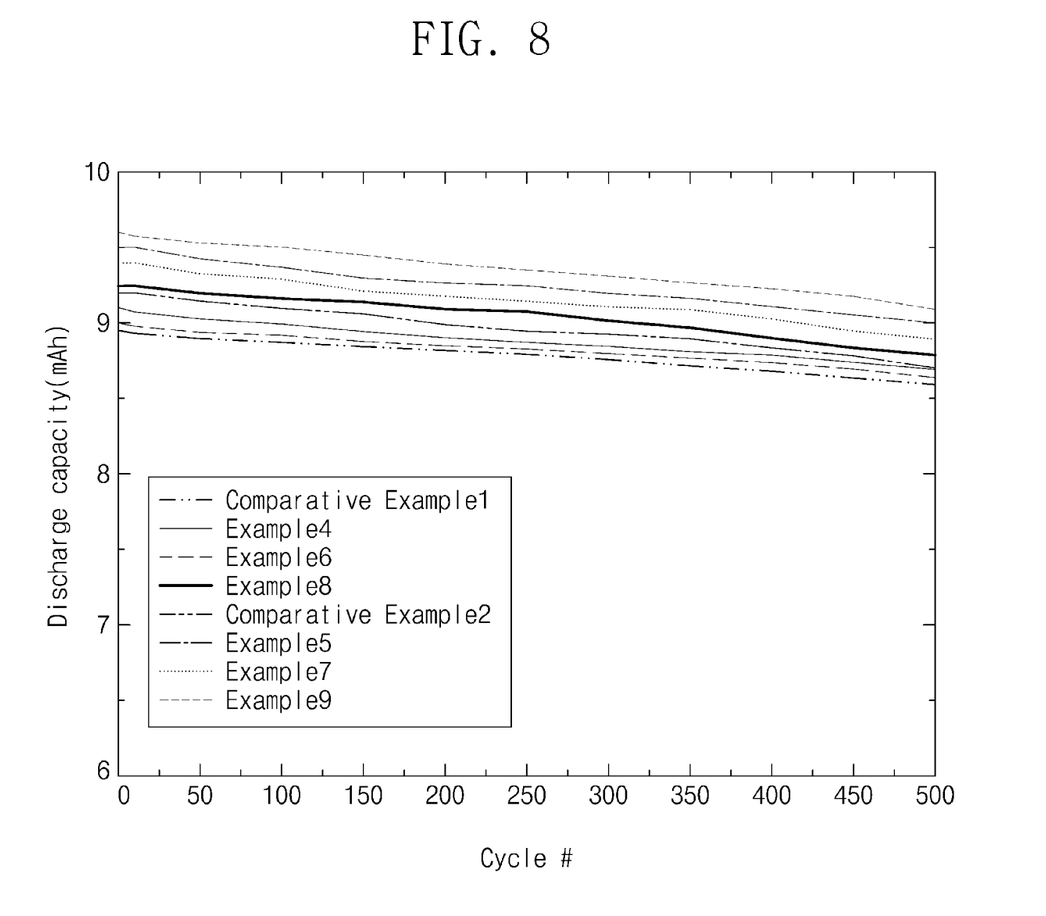
FIG. 8 is a graph showing measured results of life characteristics for single cells constituted using ceramic coated separators manufactured in Example 4 to Example 9, Comparative Example 1 and Comparative Example 2.

FIG. 8 is a graph showing measured results of life characteristics for single cells constituted using ceramic coated separators manufactured in Example 4 to Example 9, Comparative Example 1 and Comparative Example 2. Though initial discharge capacity was changed according to the uptake amount and the thickness of the ceramic coated layer, there were no significant differences of behavior for the life characteristics up to 500 cycles between Example 4 to Example 9, and Comparative Example 1 and Comparative Example 2.

According to the inventive concept, the dispersibility of ceramic particles in a coating composition for a separator of a secondary battery may be effectively maintained, and at the same time, adhesion between the coating composition for a separator of a secondary battery and the surface of the separator of a secondary battery may increase. Acrylic polymer chains radially crosslinked at the surface of an emulsion-type binder suppresses agglomeration phenomenon of the emulsion-type binder, and problems of the blocking of ion movement paths through the filling of the porous structure at the surface of the separator with an emulsion binder or ceramic particles may be solved. In addition, since storage stability at room temperature and at a high temperature is improved, the shelf life of the coating composition for a separator of a secondary battery may be improved. Accordingly, price competitiveness, thermal stability and physical strength of the separator of a secondary battery according to the inventive concept may be improved.

Further, the lithium ion battery based on a liquid electrolyte including the coating composition for a separator of a secondary battery according to the inventive concept may improve thermal stability and mechanical stability and may control the dispersion of an electrolyte including lithium ions uniformly at the surface and inside of the separator, and accordingly, a lithium metal secondary battery with improved long-life characteristics may be provided.

Although the embodiments of the present invention have been described, it is understood that the present invention should not be limited to these embodiments, but various changes and modifications can be made by one ordinary skilled in the art within the spirit and scope of the present invention as hereinafter claimed.

What is claimed is:

1. A method of preparing a coating composition for a separator of a secondary battery, the method comprising:
    dispersing a first monomer and a surfactant in a solvent to form micelles;
    adding a first initiator to the solvent and performing first polymerization reaction to form a precursor solution comprising a core portion; and
    adding a second monomer and a second initiator to the precursor solution and performing second polymerization reaction to form a binder solution comprising a binder particle, wherein the binder particle comprising the core portion and a shell portion wrapping the core portion and the shell portion comprises:
    a coating layer wrapping the surface of the core portion; and
    a polymer chain crosslinked to the coating layer at an end of the polymer chain and extending radially outward from the coating layer,
    wherein the polymer chain is water-soluble, and
    the core portion and the shell portion are chemically bonded.

2. The method of preparing a coating composition for a separator of a secondary battery of claim 1, further comprising dispersing ceramic particles in the aqueous binder solution to form a slurry.

3. The method of preparing a coating composition for a separator of a secondary battery of claim 1, wherein
    the core portion comprises a first acrylic polymer,
    the coating layer comprises a second acrylic polymer, and
    the polymer chain comprises a second acrylic polymer chain.

4. The method of preparing a coating composition for a separator of a secondary battery of claim 1, wherein the first monomer comprises at least one among carboxyethyl acrylate, hydroxyethyl acrylate, ethylhexyl acrylate, methyl acrylate, ethyl acrylate, butyl acrylate, hexyl acrylate, lauryl acrylate, propargyl acrylate, isobutyl acrylate, methyl methacrylate, ethyl methacrylate, butyl methacrylate, hydroxyethyl methacrylate, hydroxypropyl methacrylate, ethylhexyl methacrylate, glycidyl methacrylate, stearyl methacrylate, lauryl methacrylate, acrylic acid, methacrylic acid, sodium acrylate, sodium methacrylate, acrylonitrile, acrylamide, and methacrylamide.

5. The method of preparing a coating composition for a separator of a secondary battery of claim 1, wherein the second monomer comprises at least one among acrylic acid, methacrylic acid, sodium acrylate, and sodium methacrylate.

6. The method of preparing a coating composition for a separator of a secondary battery of claim 5, wherein the performing of the second polymerization reaction further comprises adding a comonomer to the second monomer, and
    the comonomer comprises at least one among carboxyethyl acrylate, hydroxyethyl acrylate, ethylhexyl acrylate, methyl acrylate, ethyl acrylate, butyl acrylate, hexyl acrylate, lauryl acrylate, propargyl acrylate, isobutyl acrylate, methyl methacrylate, ethyl methacrylate, butyl methacrylate, hydroxyethyl methacrylate, hydroxypropyl methacrylate, ethylhexyl methacrylate, glycidyl methacrylate, stearyl methacrylate, lauryl methacrylate, acrylonitrile, acrylamide, and methacrylamide.

7. The method of preparing a coating composition for a separator of a secondary battery of claim 1, wherein the first polymerization reaction is an emulsion polymerization reaction.

8. The method of preparing a coating composition for a separator of a secondary battery of claim 1, wherein the second polymerization reaction is a redox polymerization reaction.

9. The method of preparing a coating composition for a separator of a secondary battery of claim 1, wherein the first initiator comprises at least one among hydrogen peroxide, ammonium persulfate, a ferrous salt, potassium persulfate, sodium bisulfite, sodium peroxomonosulfate, and sodium peroxydiphosphate.

10. The method of preparing a coating composition for a separator of a secondary battery of claim 1, wherein the second initiator comprises at least one among potassium persulfate, sodium bisulfite, sodium peroxomonosulfate, and sodium peroxydiphosphate.

11. The method of preparing a coating composition for a separator of a secondary battery of claim 1, wherein the surfactant comprises an anionic surfactant such as sodium dodecylbenzenesulfonate, ammonium dodecylbenzenesulfonate, sodium polyoxyethylene alkyl aryl sulfate, ammonium polyoxyethylene alkyl sulfate, polyoxyethylene aryl ether phosphate, and polyoxyethylene alkyl ether phosphate, or at least one among polyethylene glycol, polypropylene glycol, polyoxyethylene alkyl ether, polyoxypropylene alkyl ether, polyoxyethylene polyoxypropylene alkyl ether, polyoxyethylene alkylamine, hydroxymethyl cellulose, hydroxyethyl cellulose, and hydroxybutyl cellulose.

12. A method of manufacturing a separator of a secondary battery, the method comprising:
    dispersing a first monomer and a surfactant in a solvent to form micelles;
    adding a first initiator to the solvent and performing first polymerization reaction to form a precursor solution comprising a core portion;
    adding a second monomer and a second initiator to the precursor solution and performing second polymerization reaction to form a binder solution comprising a binder particle;

dispersing ceramic particles in the aqueous binder solution to form a slurry; and applying the slurry on a separator base material, wherein the binder particle comprising the core portion and a shell portion wrapping the core portion, and the shell portion comprises:

a coating layer wrapping the surface of the core portion;

a polymer chain crosslinked to the coating layer at an end of the polymer chain and extending radially outward from the coating layer; and the polymer chain is water-soluble, the ceramic particles have a size from about 500 nm to about 5 μm, and the core portion and the shell portion are chemically bonded.

13. The method of manufacturing a separator of a secondary battery of claim 12, wherein the ceramic particle comprises at least one among alumina, boehmite, silicon dioxide, titanium dioxide, zirconium dioxide, ruthenium oxide, iron oxide, cobalt oxide, and nickel oxide.

14. The method of manufacturing a separator of a secondary battery of claim 12, wherein the core portion has a weight average molecular weight (Mw) of about 100,000 to about 1,000,000.

15. The method of manufacturing a separator of a secondary battery of claim 12, wherein the binder particle has a weight average molecular weight (Mw) of about 100,000 to about 1,500,000.

16. The method of manufacturing a separator of a secondary battery of claim 12, further comprising forming a coating layer through drying the slurry applied on the separator base material, and a thickness of the coating layer is from about 0.5 μm to about 10 μm.

17. The method of manufacturing a separator of a secondary battery of claim 12, wherein a weight ratio of the ceramic particles and the aqueous-binder particles is from about 60:40 to about 99:1.

18. The method of manufacturing a separator of a secondary battery of claim 12, wherein an average particle size of the binder particles is from about 0.1 μm to about 5 μm.

* * * * *